Dec. 13, 1927.
W. F. McCOY ET AL
1,652,677
SLACK ADJUSTER
Filed Nov. 24, 1926
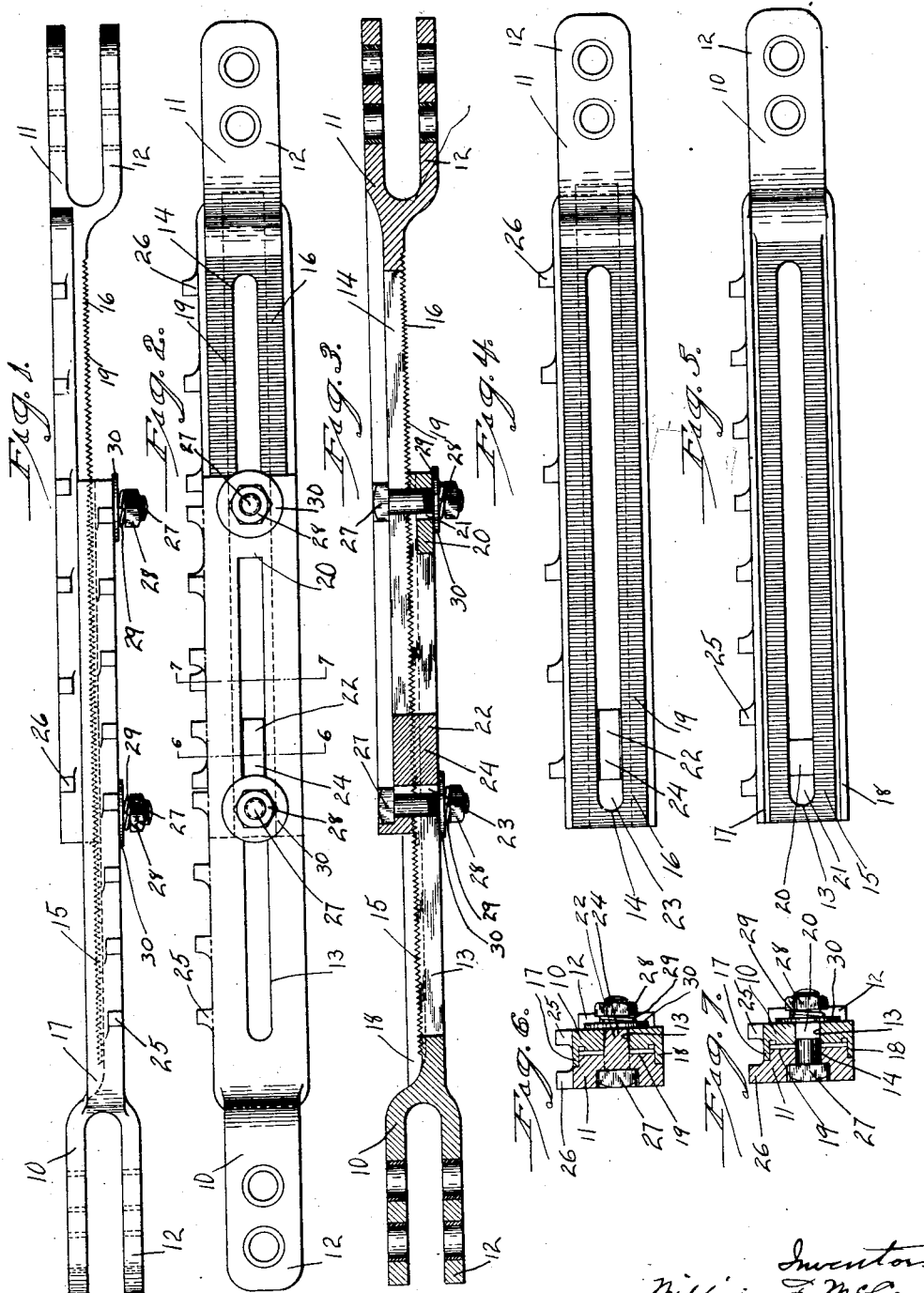

Patented Dec. 13, 1927.

1,652,677

UNITED STATES PATENT OFFICE.

WILLIAM F. McCOY AND PAUL W. RIPPLE, OF NEW HAVEN, CONNECTICUT.

SLACK ADJUSTER.

Application filed November 24, 1926. Serial No. 150,426.

This invention relates to improvement in slack-adjusters, that is, devices to be used in place of turn-buckles, the object of the invention being to provide a non-slipping slack-adjuster which, while adapted particularly for use in connection with brake mechanisms for railroad and street cars, is equally applicable for use in brakes for automobiles or in any other place where a turn-buckle is commonly used. A further object is to provide a slack-adjuster which, while adapted for rapid adjustment, will be readily held in a locked position, so as to prevent slipping during adjustment and the invention consists in the construction as hereinafter described and particularly recited in the claims.

In the accompanying drawings:

Fig. 1 is a top view of a slack-adjuster constructed in accordance with our invention;

Fig. 2 is a side view of the same;

Fig. 3 is a longitudinal sectional view of the same;

Fig. 4 is an inside face view of one member;

Fig. 5 is a corresponding face view of the other member;

Fig. 6 is a sectional view on the line 6—6 of Fig. 2; and

Fig. 7 is a sectional view on the line 7—7 of Fig. 2.

In carrying out our invention, we employ two members 10 and 11, each formed at the outer ends with forks 12 or otherwise adapted for connection with mechanisms to be held. The member 10 is formed with a longitudinal slot 13 and the member 11 with a corresponding slot 14, and the adjacent faces of these members are respectively formed with transverse teeth 15 and 16 which are adapted to interlock when the members are placed face to face. Preferably, one member, as 10, is formed with flanges 17 and 18 between which the inner face 19 of the member 11 extends, so that the parts are held against longitudinal bending. In the slot 13 is a bridge 20, near the end of the slot, so as to form a bolt-opening 21 at the end of the slot, while the member 11 is formed with a bridge 22 forming a bolt-opening 23, and if desired, this bridge 22 may be extended to form a lug 24, which enters the slot 13 of the member 10. On one edge, the member 10 is formed with upwardly-projecting studs 25 and the member 11 is formed with corresponding studs 26 for the purpose as will hereinafter appear.

In assembilng the two members are placed together face to face, so that the teeth 15 and 16 interlock, and then bolts 27 are passed through the bolt-openings 21 and 23 and nuts 28 are applied to the ends thereof. Preferably, these nuts bear on springs 29 which rest on washers 30, so that the two members are rigidly interlocked.

Of course, in assembling the parts, they are brougt to substantially the desired position, but for final adjustment the nuts 28 will be turned off sufficiently to allow the teeth to disengage, the spring however holding them in engagement. A screw-driver or other device is inserted between one of the studs 25 of one member and the adjacent stud 26 of the other member and moved in one direction or the other to move the members longitudinally, and in this movement the teeth will slip past each other, owing to the play between the parts caused by loosening the bolts, but the parts can be easily held in any position of adjustment until the nuts on the bolts are tightened.

We thus provide, in a very simple manner, a slack adjuster which is non-slipping when adjustment is being made, which will firmly connect the two parts even under great strain, and which permits of ready adjustment.

We claim:

1. A slack-adjuster, comprising two overlapping members, each formed with an enclosed longitudinal slot, the adjacent faces of both members formed with transverse teeth, a bridge across each slot near one end thereof forming a bolt-opening, one of said bridges extended to form a lug extending through the slot in the other member, and bolts extending through said openings for locking the two parts together.

2. A slack-adjuster, comprising two overlapping members, each formed with a longitudinal slot, the adjacent faces of said members formed with transverse teeth adapted to interlock, means for locking the two members together, and each of the members formed on one edge with a series of outwardly-projecting lugs on the same side of the slot.

In testimony whereof, we have signed this specification.

WILLIAM F. McCOY.
PAUL W. RIPPLE.